United States Patent Office 3,754,062
Patented Aug. 21, 1973

3,754,062
METHOD FOR ENCAPSULATION OF HYDROPHOBIC MATERIALS UTILIZING URETHANE ELASTOMERS
Takehiko Kobayashi, 1-4-15-415 Yamanone-cho, Zushi-shi, Kanagawa-ken, Japan
No Drawing. Filed Mar. 19, 1971, Ser. No. 126,353
Claims priority, application Japan, Aug. 21, 1970, 45/72,750
Int. Cl. A61j 5/00; B29c 13/00
U.S. Cl. 264—4       7 Claims

ABSTRACT OF THE DISCLOSURE

A method is disclosed for encapsulating hydrophobic materials by applying an admixture of urethane elastomer and epichlorohydrin in droplets to a polyamine solution so that polymerization proceeds at the interface between the hydrophobic liquid phase and the aqueous phase to deposit a capsular film on hydrophobic liquid droplets.

---

This invention relates to an improved method for encapsulating a variety of particulate hydrophobic materials.

Heretofore, there have been introduced various processes for encapsulating hydrophobic liquid droplets. A typical example is the so-called coacervation process wherein a hydrophilic colloid is allowed to deposit as a film on fine hydrophobic liquid droplets in an aqueous dispersion. This process has the drawback that a considerable length of time is required for desired film formation and the film is structurally weak. Another example is the interfacial polymerization wherein a hydrophobic liquid having a monomer dissolved therein is finely dispersed in a polar liquid and the monomer is polymerized to form a film interface between the two liquid phases, the resulting film being insoluble in either of hydrophobic and polar liquids. Such encapsulation process is not only time-consuming but also makes it difficult to provide capsules of uniform thickness. It has the further drawback that capsules are often formed coreless or without surrounding desired hydrophobic liquid droplets, and that since the interfacial polymerization process is carried out usually in the presence of a catalyst, the catalyst that fails to be consumed in the polymerization reaction tends to remain within the resulting capsules.

It is an object of the present invention to provide an improved method for encapsulation of hydrophobic materials in particulate form which will provide desired capsules at faster rate of speed and in the absence of catalysts.

More specifically, the invention will provide such microcapsules self-containing hydrophobic liquid droplets that are structurally strong, tolerant of water and resistant to chemicals.

These objects and advantages of the invention will be apparent from the following detailed description rendered in connection with preferred embodiments of the invention, which embodiments are only illustrative and should not be construed in a limiting sense.

Briefly stated, the method according to the invention comprises; dissolving a mixture of a urethane elastomer or urethane prepolymer and epichlorohydrin in a hydrophobic liquid; dispersing the resultant admixture in droplet form in an amine solution; and subjecting the resultant dispersion to an interfacial polymerization reaction at temperatures ranging between 25° C. and 60° C. for a duration of from 20 minutes to 10 hours.

More specifically, the instant method comprises; admixing a urethane elastomer or urethane prepolymer with epichlorohydrin, the amount of epichlorohydrin being on the order of 5 to 30% by weight of said urethane; dissolving the resultant admixture in a hydrophobic liquid, the amount of said admixture being on the order of 10–50 weight percent of said hydrophobic liquid; dispersing the resultant hydrophobic admixture in droplets of 5–500 microns in an amine solution containing a polyamine in an amount exceeding chemical equivalents of said urethane and epichlorohydrin; and subjecting the resultant dispersion to an interfacial polymerization reaction at temperatures ranging between 25° C. and 60° C. for a duration of from 20 minutes to 10 hours wherein said urethane elastomer or urethane prepolymer and said epichlorohydrin undergo reaction with said polyamine at the interface between the hydrophobic liquid droplets and the amine solution, resulting in the formation of an insoluble polymeric film around said hydrophobic liquid droplets.

Alternatively, the hydrophobic admixture may be first dispersed in water free of polyamine, followed by addition of polyamine to the disperison.

By way of definition, the term urethane elastomer or urethane prepolymer is intended to include liquid urethane polymers containing 4–15% of free or active isocyanate. Typical examples are Adiprene L–100, L–167 and LD–213 (trade name of Du Pont, U.S.A.), Olester-P–49–75S and P50–60ST (trade name of Mitsui Tohatsu, Japan), Takenate D–102, D–103, D–104, D–200 and D–202 (trade name of Takeda Chemicals, Japan), and Collnate-L (trade name of Nippon Polyurethane, Japan). The term hydrophobic liquid as used herein includes generally any liquid or liquids immiscible in water and further includes such liquids as may have dissolved or dispersed therein a variety of materials including for example pigments, dyes, germicides, insecticides and like chemicals. Typical examples of such hydrophobic liquids are castor oil, lemon oil, spindle oil, gasoline, benzene, toluene, cyclohexane, oleic acid, dibutylphthalate, carbon tetrachloride and the like.

Generally, urethane elastomers are insoluble with hydrophobic materials. To make these a homogeneous mixture according to the invention, there is used epichlorohydrin which may be in this sense a solvent-like agent for urethane elastomers. However, it is to be noted that epichlorohydrin as used in the method of the instant invention plays a more important role in that it lends itself to a capsule-forming reaction. Therefore, epichlorohydrin as used in accord with the invention is characteristically different from solvents such as ethyl acetate, benzene and toluene; these solvents act to dissolve a urethane elastomer homogeneously in a hydrophobic liquid but cannot react with a polyamine and hence tend to remain objectionably within the hydrophobic liquid after the urethane elastomer has been consumed by reaction with the polyamine. In contrast, it has been ascertained that epichlorohydrin acts not only as an agent to promote dissolving the urethane elastomer in a hydrophobic liquid, but also lends itself to consumption by reacting with a polyamine and therefore does not remain in the resulting hydrophobic capsules. The ratio of urethane elastomer to epichlorohydrin is desirably in the range of 5 to 30 weight percent.

The admixture of urethane elastomer and epichlorohydrin may be advantageously used in an amount of from 10 to 50% of the hydrophobic liquid used.

The term polyamine as used herein includes ethylene diamine, hexamethylene diamine, p-piperazine, triethylene tetramine, phenylene diamine, diamino pyridine, Epicoat-U (trade name of Shell Oil Co., U.S.A.) and initial condensation products of urea or melamine and formaldehyde. Preferred amounts of such polyamine in an aqueous solution are in excess of chemical equivalents of urethane elastomer and epichlorohydrin, more preferably 10–15% greater.

Dispersion of hydrophobic liquid droplets in a polyamine solution may be effected by means of a suitable emulsifying apparatus and if necessary in the presence of emulsifiers. However, ionic or non-ionic surfactants should be avoided because they will react with isocyanate contained in starting urethane elastomer. Emulsifiers suitable for present purposes are polyvinyl alcohol, carboxy methyl cellulose, carboxy methyl starch, hydroxy ethyl starch, hydroxy propyl starch, polyvinyl pyrrolidone, gum arabic, tragacanth rubber and styrene/maleic acid anhydride copolymer.

Experiments indicate that a dispersion system comprising an amine solution and a particulate hydrophobic liquid may be maintained at temperatures of from 25° to 60° C. for about 20 minutes to 10 hours, until the polyamine in the solution reacts with respectively urethane elastomer and epichlorohydrin in the hydrophobic mixture, resulting in deposition of a polymeric capsular film on hydrophobic liquid droplets. The reaction time may vary with the type of polyamine, with the amount of free isocyanate in the urethane elastomer and with temperature.

Experiments also indicate that the polymeric capsules obtained according to the method of the invention are highly tolerant of water, resistant to chemicals and structurally stable. Although the reason for the phenomenon is not ascertainable, such excellent characteristics of the capsules are believed to be attributable to the fact that the capsules comprise not only dual reaction products of polyamine respectively with urethane elastomer and epichlorohydrin alone, but further comprise an additional reaction product of polyamine-epichlorohydrin reaction product with urethane elastomer. That is to say, the reaction product of polyamine and epichlorohydrin undergoes further reaction with urethane elastomer to thereby fortify the capsule wall.

EXAMPLE 1

To 10 grams lemon oil were added 2 grams Olester P50–60ST containing 8.5–9.5% of free isocyanate and 1 gram epichlorohydrin. The resulting solution was introduced in droplets of 50–100 microns with stirring into 100 grams water containing 15 grams polyvinyl alcohol. The resulting dispersion was heated at 30° C. with stirring and added slowly with droplets of 10 grams amine solution containing 0.5 gram ethylene diamine. The whole was thus disposed for 3 hours, and there was obtained a capsular product self-containing lemon oil.

EXAMPLE 2

0.5 gram bis-(p-dimethyl amine phenyl)-benzotriazyl-methane was dissolved in a mixture of 9 grams toluene and 1 gram diphenyl chloride. The resulting solution was not co-miscible with Takenate D–102 containing about 13% free isocyanate. Therefore, the dye solution was first added with 1 gram epichlorohydrin and then with 2 grams Takenate D–102 thereby obtaining a homogeneous admixture. This admixture was dispersed in droplets of 5–10 microns with stirring, in 150 grams water containing 1 gram carboxy methyl cellulose. Stirring was continued, and the dispersion was held at 30° C. and added slowly with 10 grams amine solution containing 0.8 gram phenylene diamine. The reaction was continued for 4 hours, until there was obtained a dye-containing capsular product. This capsular product was washed with water, filtered and dried.

EXAMPLE 3

The procedure described in Example 2 was followed except that ethyl acetate was used in place of epichlorohydrin and that the amount of Takenate D–102 was 3 grams. The results of this example were compared with those of Example 2 in respect of the structural strength, resistance to chemicals and resistance to heat of the respective capsular products, as shown below.

The strength of the capsules was measured by Schopper tensile machine. The resistance to chemicals was determined by the procedure in which the capsular product was dispersed in ethyl acetate held at 25° C., and 0.03 cc. of the resultant dispersion was applied once each day in droplets to a blotting paper having Appapulgite clay deposited thereon, until a color appeared on the blotting paper. The resistance to heat was determined by the procedure in which the capsular product was dispersed in boiling water, and 0.03 cc. of the resultant dispersion was applied to a similar blotting paper once every hour, until the paper generated a color.

| Capsular film | Example 2 | Example 3 |
|---|---|---|
| Strength | 1,100 g./mm.$^2$ | 285 g./mm.$^2$ |
| Resistance to chemicals. | Content not exuded over 6 months | Content exuded after 4 days. |
| Resistance to heat | Not ruptured over 10 hours. | Ruptured after 5 hours. |

Having thus described the invention, it is to be understood that the present invention is not to be limited to the exact compositions or methods shown and described as obvious modifications and equivalents will be apparent to those skilled in the art without departing from the spirit and scope of the appended claims.

What is claimed is:

1. A method for encapsulating hydrophobic materials which comprises: dissolving a mixture of a urethane elastomer and epichlorohydrin in a hydrophobic liquid; dispersing the resultant admixture in droplet form in a solution of ethylene diamine, hexamethylene diamine, p-piperazine, triethylene tetramine, phenylene diamine, diamino pyridine, the initial condensation products of urea-formaldehyde and melamine-formaldehyde, or amine adducts of epoxy compounds; and subjecting the resultant dispersion to an interfacial polymerization reaction at temperatures ranging between 25° C. and 60° C. for a duration of from 20 minutes to 10 hours.

2. The method as defined in claim 1 wherein said urethane elastomer is a liquid urethane polymer containing 4–15% of free isocyanate group.

3. The method according to claim 1 wherein said hydrophobic liquid is castor oil, lemon oil, spindle oil, gasoline, benzene, toluene, cyclohexane, oleic acid, dibutylphthalate, or carbon tetrachloride.

4. The method according to claim 1 wherein said hydrophobic liquid has dispersed therein at least one pigment, dye, germicide or insecticide.

5. A method for encapsulating hydrophobic materials which comprises: admixing a urethane elastomer with epichlorohydrin, the amount of epichlorohydrin being on the order of 5 to 30% by weight of urethane elastomer; dissolving the resultant admixture in a hydrophobic liquid, the amount of said admixture being on the order of 10 to 50% by weight of said hydrophobic liquid; dispersing the resultant hydrophobic admixture in droplets of from 5 to 500 microns in a solution of a polyamine which is a solution of ethylene diamine, hexamethylene diamine, p-piperazine, triethylene tetramine, phenylene diamine, diamino pyridine, the initial condensation products of urea-formaldehyde and melamine-formaldehyde, or amine adducts of epoxy compounds; in an amount exceeding chemical equivalents of said urethane and epichlorohydrin; and subjecting the resultant dispersion to an interfacial polymerization reaction at temperatures ranging between 25° C. and 60° C. for a duration of from 20 minutes to 10 hours, in which polymerization reaction, said urethane elastomer and said epichlorohydrin respectively undergo reaction with said polyamine at the interface between the hydrophobic liquid droplets and the amine solution, resulting in the formation of an insoluble polymeric film around said hydrophobic liquid droplets.

6. The method as defined in claim 5 wherein said polyamine is used in an amount about 10 to 15% in excess of chemical equivalents of said urethane elastomer and epichlorohydrin.

7. The method as defined in claim 5 wherein said amine solution further contains at least one of emulsifiers selected from the group consisting of polyvinyl alcohol, carboxy methyl cellulose, carboxy methyl starch, hydroxy ethyl starch, hydroxy propyl starch, polyvinyl pyrrolidone, gum arabic, tragacanth rubber and styrene-maleic acid anhydride copolymer.

References Cited

UNITED STATES PATENTS

| 3,575,882 | 4/1971 | Vandegaer et al. | 264—4 X |
| 3,577,515 | 5/1971 | Vandegaer | 264—4 X |

FOREIGN PATENTS

| 1,091,076 | 11/1967 | Great Britain | 252—316 |
| 1,091,077 | 11/1967 | Great Britain | 252—316 |

PHILIP E. ANDERSON, Primary Examiner

U.S. Cl. X.R.

252—316; 424—32